United States Patent [19]

Lee

[11] Patent Number: 5,764,308
[45] Date of Patent: Jun. 9, 1998

[54] METHOD OF ADJUSTING HUE AND DEVICE THEREFOR

[75] Inventor: Je-suk Lee, Suwon, Rep. of Korea

[73] Assignee: Samsung Electronics Co., Ltd., Suwon, Rep. of Korea

[21] Appl. No.: 663,581

[22] Filed: Jun. 14, 1996

[30] Foreign Application Priority Data

Dec. 28, 1995 [KR] Rep. of Korea .................. 1995-62185

[51] Int. Cl.$^6$ ...................................................... H04N 9/64
[52] U.S. Cl. ........................................... 348/649; 382/167
[58] Field of Search ...................... 348/645, 646, 348/649–653, 655, 656; 345/150, 153, 154; 358/518, 520; 382/162, 167; H04N 9/64

[56] References Cited

U.S. PATENT DOCUMENTS

| | | | |
|---|---|---|---|
| 4,558,351 | 12/1985 | Fling et al. | 348/651 |
| 4,679,072 | 7/1987 | Takayama | 348/649 |
| 5,436,673 | 7/1995 | Bachmann et al. | 348/649 |
| 5,555,031 | 9/1996 | Van Rooij | 348/652 |
| 5,563,666 | 10/1996 | Suzuki | 348/646 |
| 5,619,280 | 4/1997 | Yamashita et al. | 348/649 |
| 5,691,779 | 11/1997 | Yamashita et al. | 348/645 |

*Primary Examiner*—Richard Lee
*Attorney, Agent, or Firm*—Allen LeRoy Limberg

[57] ABSTRACT

A method of adjusting hue in color video signals partitions the region of all available hues into subregions in accordance with the signs of U and V components of input color video signals, which U and V signals are respectively proportional to blue-minus-luminance and red-minus luminance color-difference signals. The hue in each subregion is adjusted independently of the hues in the other subregions. Within each subregion, each of the U and V components of the input color video signals that fall therein is gain-adjusted by prescribed factors according to the subregion. A hue adjustment device determines from the signs U and V components of input color video signals which of the subregions they fall into, and adjusts the hue in each subregion to facilitate more accurate hue adjustment.

11 Claims, 2 Drawing Sheets

METHOD OF ADJUSTING HUE AND DEVICE THEREFOR

The present invention relates to a method of adjusting hue in a video signal and a device for carrying out the method, the method more particularly being one in which the region of all hue values is divided into multiple subregions, and the hues in each subregion are adjusted independently of the hues in the other subregions.

BACKGROUND OF THE INVENTION

Many video signal processing devices use methods of processing chrominance signals as defined by color-difference signals U=(B−Y)/2.03 and V=(R−Y)/1.14. For example, in a standard NTSC color television system, a transmitter portion converts red (R), green (G) and blue (B) color signals obtained from an object into a Y luminance signal and into I and Q color-difference signals, and then transmits the converted signals loaded on a carrier wave. A receiver portion demodulates the I and Q signals from a received wave and converts the I and Q signals into U and V color-difference signals or, alternatively, demodulates the U and V color-difference signals directly from a received wave. Then, the U and V color difference signals are converted into the R, G and B color signals for driving a color kinescope.

Hue can be defined in a two-dimensional space, or region of hue values, according to normalized U and V orthogonal coordinates. Normalization of color difference signals removes the effects of color intensity or saturation, and normalization of the U and V color difference signals is done by dividing both of them each by $\sqrt{U^2+V^2}$. When referring to hue in terms of the two color difference signals U and V in this specification, normalization to separate hue from color intensity or saturation will be implicitly assumed, whether or not normalization is in fact done.

The adjustment of hue in video signal processing devices using color difference signals can be accomplished by admixing a respective fraction of each of the two color difference signals U and V with the other color difference signal. In one such method of adjusting hue, which method is known, the relative fractions of the two color difference signals U and V admixed with each other are adjusted similarly for the entire region of available hue values. In another such method of adjusting hue, which method is known, the entire region of available hue values is divided into two subregions, and then the respective fractions of the two color difference signals U and V admixed with each other is chosen differently depending on the polarity of the U=(B−Y)/2.03 input signal. Some difficulty has been experienced with satisfactorily adjusting the hue by these known methods, an adjustment so hue has a natural appearance not being possible in many circumstances.

The adjustment of hue in video signal processing devices using color difference signals can alternatively be accomplished by adjusting the relative gains of the two color difference signals U and V, rather than admixing a fraction of each with the other. This alternative method of adjusting hue is employed in the invention.

SUMMARY OF THE INVENTION

An aspect of the invention is a method of adjusting the hue of a video signal that comprises the steps of: dividing the region of available hue values into four subregions (+U,+V), (−U,+V), (−U,−V) and (+U,−V) or into a greater number of subregions as formed by subdividing one or more of the four (+U,+V), (−U,+V), (−U,−V) and (+U,−V); determining the relative gains of the U and V signals within each subregion; detecting which one of the four or more subregions includes the hue coordinates defined by the current values of the U and V components of an input video signal, for selecting that subregion, the detection being done at least in part responsive to the polarities of the current values of the U and V components of the input video signal; and generating an output video signal responsive to the input video signal in which the relative gains of the U and V signal components of the output signal are adjusted in accordance with those determined for the selected subregion.

Another aspect of the invention is apparatus for adjusting the hue of a video signal in accordance with the method set forth in the foregoing paragraph. Such apparatus comprises: a first color difference signal level converter for supplying a U-signal response to a U input signal proportional to (B−Y) color-difference signal, which U-signal response is proportional to a selected one of preset U-signal gains; a second color difference signal level converter for supplying a V-signal response to a V input signal proportional to (R−Y) color-difference signal, which V-signal response is proportional to a selected one of preset V-signal gains; a first multiplexer for selecting one of at least four preset gains in accordance with the signs of the U and V input signals, and then applying the selected gain to said first color difference signal level converter; and a second multiplexer for selecting one of at least another four preset gains in accordance with the signs of the U and V input signals, and then applying the selected gain to said second color difference signal level converter.

DETAILED DESCRIPTION OF THE INVENTION

Figure 1:
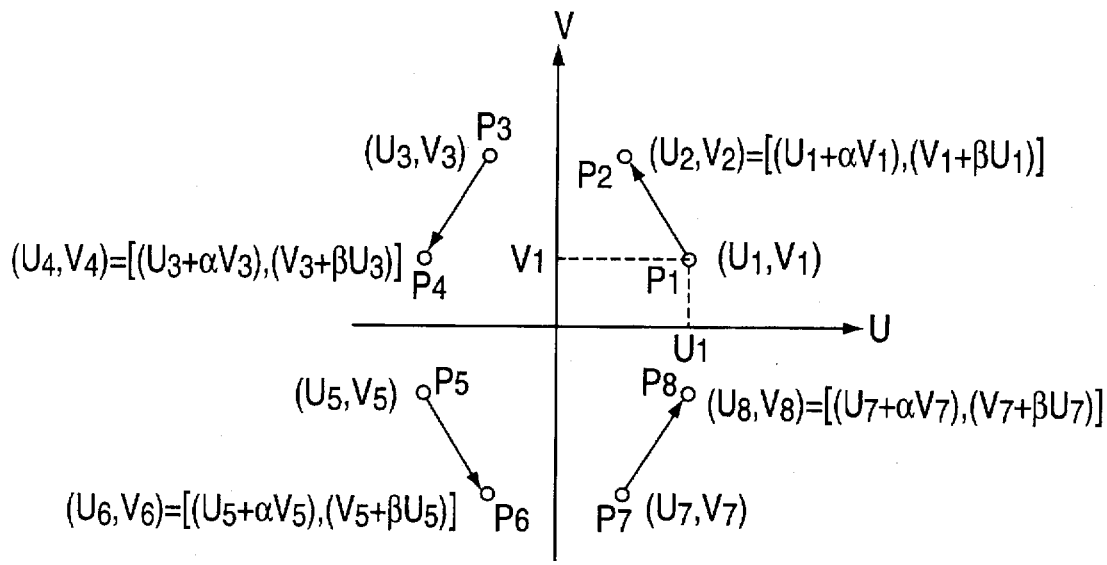
FIG. 1 illustrates a conventional method of adjusting a hue in a diagrammatic form.

FIG. 1 illustrates a conventional method of adjusting hue. In this method, each of two color difference signals has a fraction of the other combined therewith in a vector addition, and the respective fractions can be independently adjusted. For example, referring to FIG. 1, in the case where the hue $P_1$ of a currently input video signal has coordinates $(U_1, V_1)$, a predetermined fraction α of $V_1$ is added to $U_1$, and a predetermined fraction β of $U_1$ is added to $V_1$. Accordingly, the resultant hue $P_2$ $(U_2, V_2)$ in FIG. 1 becomes $(U_1+\alpha V_1, V_1+\beta U_1)$.

This procedure simplifies the device used for each color difference signal, but an accurate hue adjustment for a wide range of hues is difficult. In part this problem arises because this method of hue adjustment necessarily affects color saturation as well as hue, so adjustment of color saturation may be necessary after hue adjustment. In addition, since an equivalent gain is applied to every point in the region of available hues, even hues in undesired locations are changed. That is, $P_3$, $P_5$ and $P_7$ are changed into $P_4$, $P_6$ and $P_8$, respectively, whether or not these changes are desired.

Figure 2:
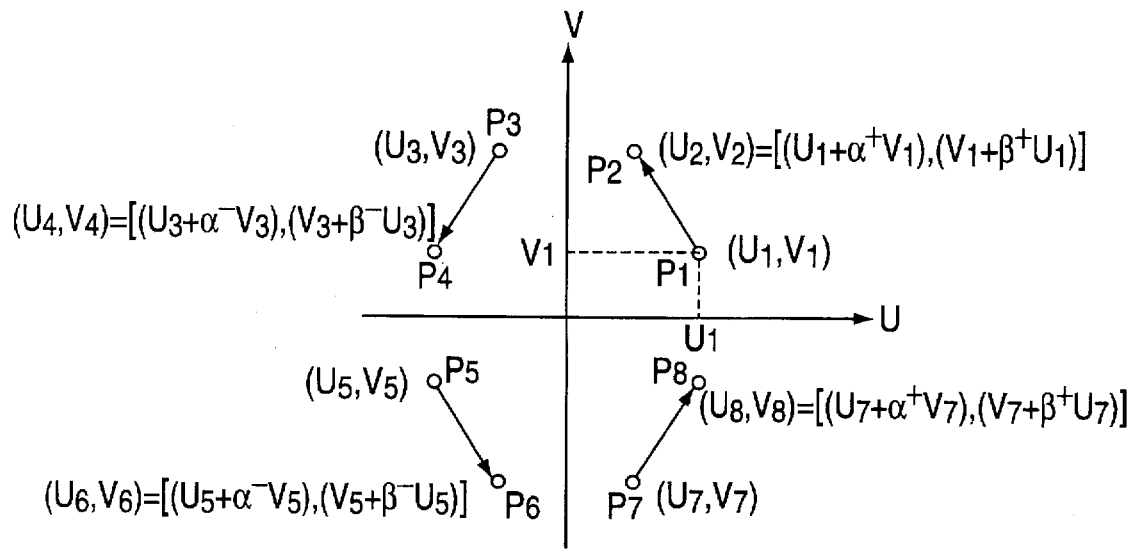
FIG. 2 illustrates diagrammatically another method of adjusting a hue known to the inventor.

FIG. 2 illustrates diagrammatically another method of adjusting a hue known to the inventor. In the method described with reference to FIG. 2, the region of available hues is divided into two subregions depending on the sign of the U=R−Y signal. The hues in one of these subregions is adjustable independent of the hues in the other of the subregions.

Referring to FIG. 2 in the case where the hue $P_1$ of the current input video has coordinates ($U_1$, $V_1$), since the sign of $U_1=(B_1-Y_1)/2.03$ is positive, $\alpha^+$ and $\beta^+$ are selected as respective adjustment gains. Accordingly, the resultant hue $P_2$ ($U_2$, $V_2$) has coordinates ($U_1+\alpha^+V_1$, $V_1+\beta^+U_1$).

In the case where the hue $P_5$ of the current input video has coordinates ($U_5$, $V_5$), since the sign of $U_5=(B_5-Y_5)$ is negative, $\alpha^-$ and $\beta^-$ are selected as respective adjustment gains. Accordingly, when hue $P_5$ is adjusted the resultant hue $P_6$ ($U_6$, $V_6$) has coordinates ($U_5+\alpha^-V_5$, $V_5+\beta^-U_5$), which can be adjusted independently of the coordinates ($U_1+\alpha^+V_1$, $V_1+\alpha^+U_1$) of the hue $P_2$ resulting from adjusting the hue $P_1$. For example, if adjustment gains $\alpha^-$ and $\beta^-$ are selected as being zero, the adjustment of the coordinates ($U_1+\alpha^-V_+V_1+\beta^+U_1$) of the hue $P_2$ does not change the values of hues such as $P_5$ and $P_7$ that have negative U coordinates.

In the case where the hue $P_3$ of the current input video has coordinates ($U_3$, $V_3$), the sign of $U_5=(R_3-Y_3)$ is positive. So, as is the case with adjusting the hue $P_1$, $\alpha^+$ and $\beta^+$ are used as respective adjustment gains. Accordingly, the hue $P_3$ is concurrently adjusted to a resultant hue $P_4$ ($U_4$, $V_4$) has coordinates ($U_4+\alpha^+V_4$, $V_4+\beta^+U_4$). This concurrent adjustment of the hue $P_3$ to the resultant hue $P_4$ is not independent of the adjustment of the hue $P_1$ to the resultant hue $P_2$. Similarly, the concurrent adjustment of the hue $P_7$ to the resultant hue $P_8$ is not independent of the adjustment of the hue $P_5$ to the resultant hue $P_6$. There is more independence in the adjustment of different hues than in the case with the method shown in FIG. 1, but practice has revealed that there is still a problem of having insufficient independence in the adjustment of different hues.

The FIG. 2 method of hue control also has the problem that there is a discontinuity in hue at the V axis.

Figure 3:
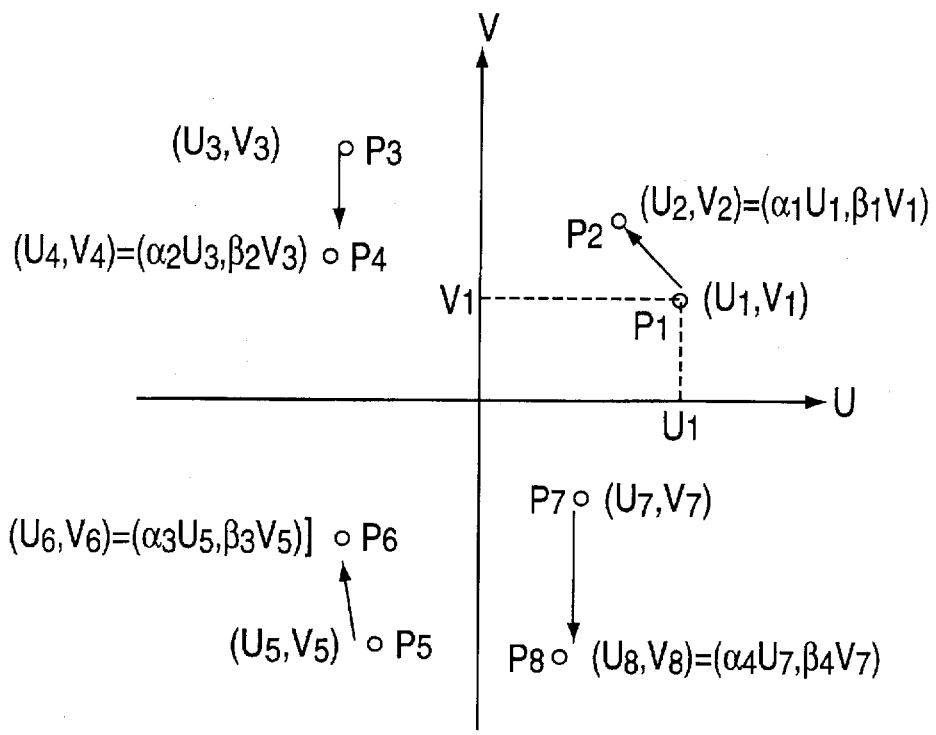
FIG. 3 illustrates diagrammatically a method of adjusting a hue in accordance with an aspect of the present invention.

FIG. 3 illustrates diagrammatically a method of adjusting a hue according to the present invention. As is generally known, the color difference signals provide Cartesian coordinates for the region of all available hues. As a result, the region of all available hues can be divided into four subregions according to the signs of the color difference signals U=(B−Y)/2.03 and V=(R−Y)/1.14. For example, a first subregion has positive U and V signals, a second subregion has negative U signal and positive V signal, a third subregion has negative U and V signals, and a fourth subregion has positive U signal and negative V signal.

In correspondence to each subregion, predetermined adjustment gains $\alpha_1$, $\alpha_2$, $\alpha_3$ and $\alpha_4$ are set for the (B−Y)/2.03 signal, and predetermined adjustment gains $\beta_1$, $\beta_2$, $\beta_3$ and $\beta_4$ are set for the V=(R−Y)/1.14 signal.

If the signs of the currently input color difference signals are detected, the location of the hue of the current video signal in the subregions can be determined. A predetermined gain is applied in accordance with the determined subregion, to adjust the hue.

In case where the hue of the currently input video signal is indicated as having coordinates ($U_1$, $V_1$), since the signs of the signals $U_1=(B_1-Y_1)/2.03$ and $V_1=(R_1-Y_1)/1.14$ are both positive, $\alpha_1$ and $\beta_1$ are selected as adjustment gains, respectively. Accordingly, the resultant hue becomes $\alpha_1U_1$, $\beta_1V_1$. Since there are no influences on the hues in the other subregions in this case, and since the case is analogous if hue is to be adjusted in another subregion, an independent hue adjustment is possible in each subregion.

Figure 4:
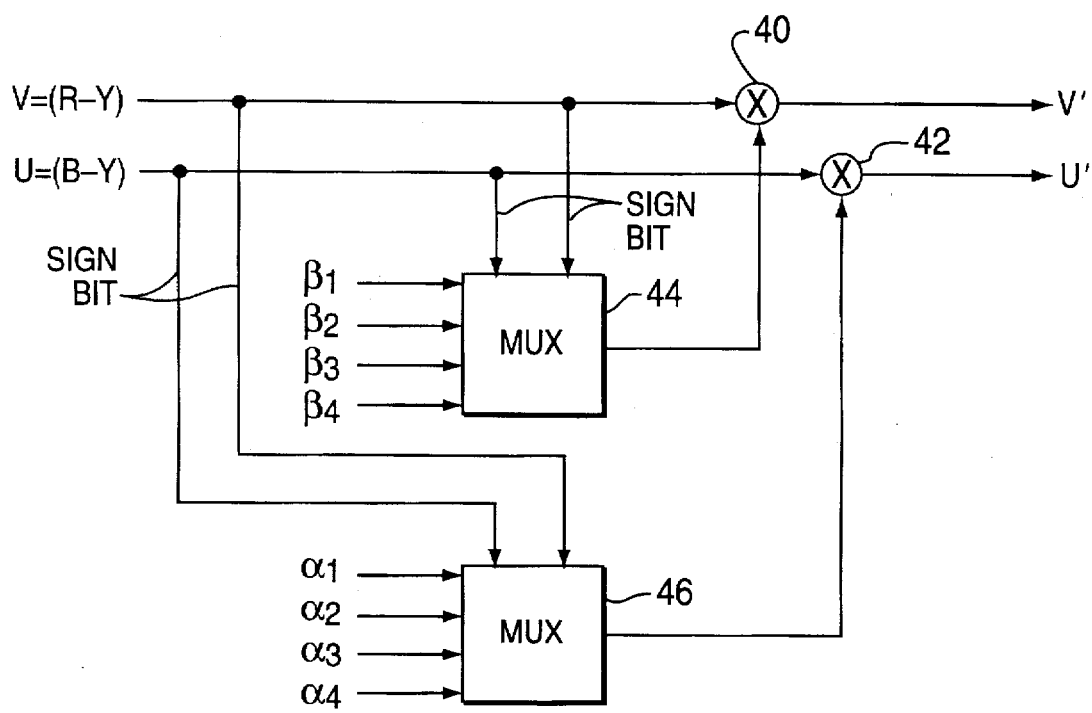
FIG. 4 is a block diagram of a hue adjusting device constructed in accordance with another aspect of the present invention.

FIG. 4 is a block diagram for showing a construction of a hue adjustment device embodying the present invention in one of its aspects. The device shown in FIG. 4 is provided with first and second color difference signal level converters 42 and 40, a first multiplexer 44 and a second multiplexer 46.

The first color difference signal level converter 42 multiplies its U=(B−Y)/2.03 input signal by a selected preset gain $\alpha_n$, to supply a gain-adjusted response U'=$\alpha_n$(B−Y)/2.03 as its output signal. The second color difference signal level converter 40 multiplies its V=(R−Y)/1.14 input signal by a selected preset gain $\beta_n$, to supply a gain-adjusted response V'=$\beta_n$(R−Y)/1.14 as its output signal. The first color difference signal level converter 42 and the second color difference signal level converter 40 can be respective multipliers, for example.

The first multiplexer 44 selects any of four preset gains $\beta_1$, $\beta_2$, $\beta_3$ and $\beta_4$ in accordance with the signs of the input R—Y and B—Y signals, and then applies the selected gain to the first color difference signal level converter 42. The second multiplexer 46 selects any of four preset gains $\alpha_1$, $\alpha_2$, $\alpha_3$ and $\alpha_4$ in accordance with the signs of the input R—Y and B—Y signals, and then applies the selected gain to the second color difference signal level converter 40. The first and second multiplexers 44 and 46 perform their respective selections by decoding sign bits of the input U=(B—Y)/2.03 and V=(R—Y)/1.14 signals.

If desired, any of the four subregions of hue may be subdivided into two subsubregions depending upon whether the absolute value of the U=(B−Y)/2.03 input signal exceeds the absolute value of the V=(R−Y)/1.14 input signal. Alternatively, any of the four subregions of hue may be subdivided into two subsubregions depending upon whether the absolute value of the U=(B—Y)/2.03 input signal exceeds the absolute value of the V=(R—Y)/1.14 input signal. Subdivision of any of the four subregions of hue can be carried out by scaling the U and V signals and then determining which of the scaling results is the larger or the smaller.

The hue adjustment scheme of the invention causes no discontinuities in hue at the U axis or at the V axis, as encountered in admixing schemes for hue adjustment.

As described above, the hue adjustment device, embodying the present invention in one of its aspects, divides the region of all available hues of the video signal into a plurality of subregions and adjusts the hue in each subregion independently. Therefore, more accurate hue adjustment is possible.

What is claimed is:

1. Apparatus for adjusting the hue of a video signal having at times a luminance signal Y comprising a red signal component R, a green signal component G and blue signal component B, comprising:

a first color difference signal level converter for supplying a U-signal response to a U input signal proportional to a (B−Y) color-difference signal, which said U-signal response is proportional to a selected one of preset U-signal gains;

a second color difference signal level converter for supplying a V-signal response to a V input signal proportional to a (R—Y) color-difference signal, which said V-signal response is proportional to a selected one of preset V-signal gains;

a first multiplexer for selecting one of a first plurality of preset gains in accordance with the signs of the U and V input signals, and then applying the selected gain to said first color difference signal level converter; and a second multiplexer for selecting one of a second plurality of preset gains in accordance with the signs of the U and V input signals, and then applying the selected gain to said second color difference signal level converter.

2. A device for adjusting the hue as claimed in claim 1, wherein said first plurality of preset gains includes at least four preset gains.

3. A device for adjusting the a hue as claimed in claim 2, wherein said second plurality of preset gains includes at least four preset gains.

4. A device for adjusting the hue as claimed in claim 1, wherein said second plurality of preset gains includes at least four preset gains.

5. A device for adjusting the hue as claimed in claim 1, wherein said first color difference signal level converter comprises a first multiplier and wherein said second color difference signal level converter comprises a second multiplier.

6. A method of adjusting the hue of a video signal comprising the steps of:

partitioning the region of available hue values into four (+U,+V), (−U,+V), (−U,−V) and (+U,−V) or into a greater number of subregions as formed by subdividing one or more of the four subregions (+U,+V), (−U,+V), (−U,−V) and (+U,−V):

determining the relative gains of the U and V signals within each subregion, the U signal being proportional to (B−Y) or blue minus luminance color-difference signal, and the V signal being proportional to (R−Y) or red minus luminance color-difference signal;

detecting which one of the four or more subregions includes the hue coordinates defined by the current values of the U and V components of an input video signal, for selecting that subregion, the detection being done at least in part responsive to the polarities of the current values of the U and V components of the input video signal; and generating an output video signal responsive to the input video signal in which the relative gains of the U and V signal components of the output signal are adjusted in accordance with those determined for the selected subregion.

7. A method of generating, in response to an input video signal including first and second color-difference signals as components thereof, an output video signal including third and fourth color-difference signals the hue of which output video signal is adjusted relative to the hue of said input video signal, comprising the steps of:

partitioning the region of all available hues into first and second subregions in accordance with the sign of the first color-difference signal;

prescribing for each of the first and second subregions a respective gain to be applied to the first color-difference signal;

prescribing for each of the first and second subregions a respective gain to be applied to the second color-difference signal;

detecting which of the first and second subregions contains the hue defined by the current first and second color-difference signals, for selecting currently prescribed gains for the first and second color-difference signals; and applying said currently prescribed gains for the first and second color-difference signals to the first and second color-difference signals for generating respective responses to the first and second color difference signals.

8. The method of claim 7, wherein said first color-difference signal is proportional to the difference of luminance signal and red color signal, and wherein said second color-difference signal is proportional to the difference of luminance signal and blue color signal.

9. The method of claim 7, wherein said first color-difference signal is proportional to the difference of luminance signal and blue color signal, and wherein said second color-difference signal is proportional to the difference of luminance signal and red color signal.

10. A method of generating, in response to an input video signal including first and second color-difference signals as components thereof, an output video signal including third and fourth color-difference signals, the hue of which output video signal is adjusted relative to the hue of said input video signal, comprising the steps of:

partitioning the region of all available hues into first, second, third and fourth subregions in accordance with the signs of the first and second color-difference signals;

prescribing for each of the first, second, third and fourth subregions a respective gain to be applied to the first color-difference signal;

prescribing for each of the first, second, third and fourth subregions a respective gain to be applied to the second color-difference signal;

detecting which of the first, second, third and fourth subregions contains the hue defined by the current first and second color-difference signals, for selecting currently prescribed gains for the first and second color-difference signals; and applying said currently prescribed gains for the first and second color-difference signals to the first and second color-difference signals for generating respective responses to the first and second color-difference signals.

11. The method of claim 10, wherein said first color-difference signal is proportional to the difference of luminance signal and red color signal, and wherein said second color-difference signal is proportional to the difference of luminance signal and blue color signal.

* * * * *